United States Patent [19]

Colpoys, Jr. et al.

[11] 3,976,138

[45] Aug. 24, 1976

[54] METHOD OF INCREASING PERMEABILITY IN SUBSURFACE EARTH FORMATION

[75] Inventors: Patrick Joseph Colpoys, Jr., Houston, Tex.; Eugene Allen Neel, Jr., Lawrenceburg, Tenn.

[73] Assignee: Union Carbide Corporation, New York, N.Y.

[22] Filed: Oct. 15, 1975

[21] Appl. No.: 622,615

Related U.S. Application Data

[63] Continuation-in-part of Ser. No. 493,908, Aug. 1, 1974, abandoned.

[52] U.S. Cl. .............................................. 166/280
[51] Int. Cl.² ........................................ E21B 43/26
[58] Field of Search .......... 166/280, 308, 271, 259, 166/281, 283

[56] References Cited

UNITED STATES PATENTS

| | | | |
|---|---|---|---|
| 2,950,247 | 8/1960 | McGuire, Jr. et al. | 166/280 |
| 3,075,581 | 1/1963 | Kern | 166/280 |
| 3,155,159 | 11/1964 | McGuire, Jr. et al. | 166/280 |

*Primary Examiner*—Stephen J. Novosad
*Attorney, Agent, or Firm*—Dominic J. Terminello

[57] ABSTRACT

Alumina propping agents having a size of at least 30 mesh are introduced into a fracture created in an oil well/or gas bearing earth formation to deposit a packed multilayer distribution of said alumina propping agents.

1 Claim, No Drawings

METHOD OF INCREASING PERMEABILITY IN SUBSURFACE EARTH FORMATION

This application is a continuaton-in-part of application, Ser. No. 493,908 filed Aug. 1, 1974, now abandoned.

This invention relates to a method for increasing permeability of a subsurface earth formation penetrated by a well and more particularly to such a method wherein fractures extending from the well into the earth formation are propped by a packed multilayer of large size alumina pellets.

For purposes of this disclosure "large size" alumina pellets are defined as being 30 mesh or larger.

As is well known in the art, it is now common practice in completing a well to create fractures extending from the well into the oil or gas bearing formation from which well fluids are to be produced. Propping agents are usually employed to prop open the fractures created once the pressure on the fracturing fluid is released and the overburden pressure tends to close the fractures.

The purpose of a conventional frac treatment is to generate a large area available to the formation fluids for flow into the well. The propped apart fractures should provide a channel of much greater permeability than the formation itself. The optimum propping agent distribution therefore is one that offers the greatest fracture permeability while possessing sufficient strength to prevent closure through particle crushing or embedment into the formation.

Much of the prior art teaches that large size propping agents are desirable to increase the fluid carrying capacity of the fracture, when the propping agents are deposited in a partial monolayer. A partial monolayer commonly refers to a fracture propped by more or less evenly spaced, single particles distributed throughout the entire fracture area. However, it is now known that with careful consideration to fluid viscosity, particle size, density, pump rate, etc., it is not feasible to perform a fracturing treatment in such a way that a partial monolayer distribution results. Ordinarily a packed multilayer is formed. A packed multilayer distribution is one in which several layers of particle form between the surfaces of the fracture during the injection period.

It has been found that when rigid propping agents of large diameter, such as sand, the most commonly used propping agent, is employed in a pack distribution that it will crush to a small size, which results in decreased permeability or even total plugging by the crushed sand fines. Malleable propping agents such as plastics, walnut hulls and/or aluminum simply deform in a pack and tend to close the spacing provided for fluid flow through the facture and therefore are totally unacceptable in a pack distribution.

Accordingly, it is common practice today to use small diameter particles in a pack distribution to avoid the problem of crushing or deforming of the propping agents. It has been unexpectedly found that contrary to what one would expect with other large size rigid propping agents, alumina particles of 30 mesh or larger do not crush in a pack distribution. Permeability tests with large diameter alumina particles in a pack show that the alumina particles are relatively insensitive to compaction pressure up to at least 15,000 psi which is greater than the pressure presently encountered in the deepest wells.

The reason for alumina's unexpected reaction in a pack distribution is not entirely known but it is theorized that inherent structure of the alumina as opposed to other rigid propping agents is most likely responsible.

Accordingly, it is the main object of this invention to provide a method for increasing the permeability of a subsurface earth formation penetrated by a well and having fractures therein propping by a packed multilayer of rigid propping agents.

A more specific object is to provide such a method using large diameter alumina propping agents.

The objects of the invention are achieved in a general way by a method wherein a fluid is pumped into a well to create a fracture. An alumina propping agent having a size of at least 30 mesh is introduced into a fluid. The fluid containing alumina propping agents is introduced into the fracture and are deposited in a packed multilayer distribution. Increased permeability to fluids of the subsurface earth fracturing is thereby obtained.

The alumina propping agents suitable for use in the present invention should be at least 60% $Al_2O_3$ and preferably greater than 80% $Al_2O_3$. The $Al_2O_3$ should preferably be alpha $Al_2O_3$. The apparent density should be at least about 2.8 grams/cc but preferably about 3.40 to 3.9 grams/c.c. The size of the alumina pellets should be greater than 30 mesh and preferably be up to 4 mesh.

The following Table I illustrates four samples of alumina pellets which are satisfactory for purposes of this invention.

TABLE I

| Chemical Analysis | Sample I | Sample II | Sample III | Sample IV |
|---|---|---|---|---|
| % $Al_2O_3$ | 88.23 | 83.23 | 61.12 | 98.12 |
| % $SiO_2$ | 7.38 | 11.32 | 36.24 | 0.13 |
| Remainder | 4.39 | 5.45 | 2.64 | 1.75 |
| Density | 3.57g/cc | 3.40g/cc | 2.85g/cc | 3.89g/cc |

Alumina pellets of the type referred to as Samples I & II were used to obtain the permeability data shown in Table II and alumina pellets of the type referred to as Sample IV were used to obtain the permeability data shown in Table III.

TABLE II

| Fracturing Compaction Pressure (psi) | Air Permeability-DARCYS | | | | |
|---|---|---|---|---|---|
| | $Al_2O_3$ (8×12M) | Sd. (8×12M) | Sd. (12×20M) | Sd. (20×40M) | Sd. (40×60M) |
| 1000 | 1500 | 2000 | 720 | 480 | 214 |
| 2000 | 1500 | 1450 | 650 | 410 | 194 |
| 3000 | 1500 | 960 | 550 | 390 | 190 |
| 4000 | 1400 | 500 | 500 | 330 | 172 |
| 5000 | 1400 | 190 | 380 | 250 | 155 |
| 6000 | 1350 | 125 | 195 | 190 | 142 |
| 7000 | 1300 | 63 | 130 | 120 | 112 |
| 8000 | 1250 | 45 | 100 | 86 | 87 |

TABLE II-continued

| Fracturing Compaction Pressure (psi) | Air Permeability-DARCYS | | | | |
|---|---|---|---|---|---|
| | Al₂O₃ (8×12M) | Sd. (8×12M) | Sd. (12×20M) | Sd. (20×40M) | Sd. (40×60M) |
| 9000 | 1225 | | | 60 | 63 |
| 10000 | 1200 | | | 46 | 49 |
| 11000 | 1200 | | | | 36 |
| 12000 | 1150 | | | | 27 |
| 13000 | 1150 | | | | 20 |
| 14000 | 1100 | | | | |
| 15000 | 1100 | | | | |

TABLE III

| | Al₂O₃ 12×20M | Sd. 12×20M | Sd. 20×40M | Sd. 40×60M |
|---|---|---|---|---|
| 1000 | 1500 | 720 | 480 | 214 |
| 2000 | 1500 | 650 | 410 | 194 |
| 3000 | 1400 | 550 | 390 | 190 |
| 4000 | 1300 | 500 | 330 | 172 |
| 5000 | 1200 | 380 | 250 | 155 |
| 6000 | 1200 | 195 | 190 | 142 |
| 7000 | 1100 | 130 | 120 | 112 |
| 8000 | 1000 | 100 | 86 | 87 |
| 9000 | 950 | | 60 | 63 |
| 10000 | 900 | | 46 | 49 |
| 11000 | 800 | | | 36 |
| 12000 | 750 | | | 27 |
| 13000 | 700 | | | 20 |
| 14000 | 600 | | | |
| 15000 | 500 | | | |

The data shown above was obtained by measuring the flow of air through a two inch diameter multilayer pack approximately 0.25 inch in thickness while pack was subjected to the fracturing compaction pressure noted. A pressure drop was maintained across the pack and the volumetric flow measured at increasing compaction pressures. The air permeability of the multilayer pack was calculated for each compaction pressure from the equation.

$$K = G \left( \frac{Q_m u}{fw} \right) \left( \frac{2P_2}{P_1^2 - P_2^2} \right)$$

where
K = permeability, darcys
G = geometric factor
$Q_m$ = volumetric flow rate at mean pressure, cc/sec
u = viscosity of gas, centipoises
fw = thickness of pack, cm
$P_1$ = inlet pressure, atmospheres
$P_2$ = outlet pressure, atmospheres As can be seen from the data in Table II, alumina pellets of 8×12 mesh still exhibited high permeability even at 15,000 psi compaction pressure, while sand of the same size become completely ineffective at 8,000 psi and only marginally useful at 3,000 psi. Even smaller size sand became only marginally useful at about 8,000 psi and completely ineffective above 13,000 psi.

The same conclusions are evident for Table III for smaller alumina pellets.

The prior art teaches that large diameter sand propping agents will crush in a multilayer distribution. Accordingly the prior art as evidenced by McGuire in U.S. Pat. No. 2,950,247 teaches that in order to increase permeability when using large diameter propping agents such as steel shot, tabular alumina spheres, aluminum spheres, glass spheres, plastic spheres, etc. they should be used in a monolayer. In fact it has been found that when the materials are used in a multilayer distribution surprisingly, only alumina spheres withstand the higher compaction pressures. This, in spite of the fact, that alumina spheres have a particle strength of about 53,000 psi as opposed for example, to glass beads which have a particle strength of about 90,000 psi. One would expect that glass beads should behave better in a multilayer since it is stronger. One would further expect that since typical sand, which has a particle strength of about 10,000 psi, and glass, which has a particle strength of about 90,000 psi, do not withstand useful compaction pressures in a multilayer distribution certainly alumina sphere would not be useful. This however was unexpectedly found not to be the case.

The following data in Table IV shows permeability of 8×12 alumina spheres (rigid propping agents), 8×12 sand (rigid), 8×12 plastic spheres (malleable); 8×12 walnut shells (natural malleable); 8×12 glass beads. The data in Table V shows permeability of 12×20 proppants.

TABLE IV

| Closure Pressure PSI | 8×12 Proppants | | | | | | | | | | | | | | |
|---|---|---|---|---|---|---|---|---|---|---|---|---|---|---|---|
| | Alumina | | | Sand | | | Glass Beads | | | Plastic | | | Walnut Shells | | |
| | K darcy | Wf in | Kh md-ft | K darcy | Wf in | Kh md-ft | K darcy | Wf in | Kh md-ft | K darcy | Wf in | Kh md-ft | K darcy | Wf in | Kh md-ft |
| 1000 | 2920 | .250 | 60,844 | 1706 | .250 | 35,534 | 2661 | .250 | 55,437 | 1690 | .250 | 35,208 | 2201 | .250 | 45,844 |
| 2000 | 2611 | .247 | 53,815 | 1112 | .225 | 20,945 | 2315 | .248 | 47,843 | 1816 | .233 | 35,175 | 1729 | .237 | 31,138 |
| 3000 | 1975 | .245 | 40,263 | 377 | .206 | 6,496 | | .241 | 39,283 | 1332 | .218 | 24,151 | 1828 | .225 | 34,198 |
| 4000 | 2007 | .243 | 40,577 | 156 | .194 | 2,536 | 1956 | .238 | 36,632 | 1044 | .202 | 17,531 | 1579 | .212 | 27,829 |
| 5000 | 1980 | .240 | 39,592 | 83 | .186 | 1,291 | 1847 | .226 | 27,741 | 783 | .187 | 12,204 | 1181 | .200 | 19,681 |
| 6000 | 1898 | .238 | 37,636 | 50 | .179 | 745 | 1473 | .187 | 6,919 | 552 | .175 | 8,020 | 872 | .190 | 13,770 |
| 7000 | 1843 | .236 | 37,636 | 27 | .171 | 376 | 444 | .174 | 246 | 379 | .164 | 5,180 | 678 | .180 | 10,164 |
| 8000 | 1775 | .233 | 34,414 | | | | | | | 282 | .156 | 3,649 | 479 | .172 | 6,856 |
| 9000 | 1791 | .229 | 34,365 | | | | | | | 187 | .148 | 2,306 | 365 | .162 | 4,927 |
| 10000 | 1695 | .226 | 31,916 | | | | | | | 124 | .142 | 1,467 | 239 | .154 | 3,067 |
| 11000 | 1625 | .224 | 30,231 | | | | | | | | | | | | |
| 12000 | 1586 | .219 | 28,194 | | | | | | | | | | | | |
| 13000 | 1462 | .215 | 26,194 | | | | | | | | | | | | |
| 14000 | 1363 | .212 | 24,080 | | | | | | | | | | | | |

TABLE V

| Closure Pressure PSI | Alumina | | | 12×20 Proppants Sand | | | Glass Beads | | | Walnut Shells | | |
|---|---|---|---|---|---|---|---|---|---|---|---|---|
| | K darcy | Wf in | Kh md-ft | K darcy | Wf in | Kh md-ft | K darcy | Wf in | Kh md-ft | K darcy | Wf in | Kh md-ft |
| 1000  | 682 | .250 | 14,208 | 712 | .250 | 15,000 | 782 | .250 | 16,292 | 1603 | .250 | 33,385 |
| 2000  | 655 | .248 | 13,526 | 643 | .246 | 13,182 | 757 | .247 | 15,582 | 1239 | .236 | 24,101 |
| 3000  | 585 | .245 | 11,938 | 578 | .242 | 11,656 | 696 | .245 | 14,210 | 985  | .223 | 18,302 |
| 4000  | 563 | .243 | 11,378 | 473 | .234 | 9,224  | 643 | .243 | 13,021 | 809  | .211 | 14,214 |
| 5000  | 538 | .240 | 10,741 | 315 | .226 | 5,933  | 593 | .240 | 11,860 | 598  | .200 | 9,933  |
| 6000  | 491 | .237 | 9,684  | 160 | .215 | 2,867  | 585 | .238 | 11,003 | 443  | .190 | 6,994  |
| 7000  | 511 | .235 | 9,966  | 98  | .208 | 1,699  | 494 | .234 | 9,633  | 334  | .182 | 5,042  |
| 8000  | 442 | .233 | 8,534  | 66  | .203 | 1,117  | 263 | .212 | 4,655  | 254  | .173 | 3,657  |
| 9000  | 431 | .229 | 8,182  | 47  | .199 | 779    | 80  | .208 | 1,387  | 207  | .168 | 2,898  |
| 10000 | 404 | .226 | 7,573  | 33  | .195 | 536    | 33  | .196 | 539    | 154  | .158 | 2,028  |
| 11000 | 345 | .223 | 6,368  |     |      |        |     |      |        |      |      |        |
| 12000 | 311 | .219 | 5,661  |     |      |        |     |      |        |      |      |        |
| 13000 | 281 | .217 | 5,047  |     |      |        |     |      |        |      |      |        |
| 14000 | 256 | .213 | 4,524  |     |      |        |     |      |        |      |      |        |
| 15000 | 228 | .211 | 3,985  |     |      |        |     |      |        |      |      |        |

From these data it will be seen that the permeability (K) for alumina spheres remains relatively high even at compaction (closure) pressures of 14,000 psi whereas the permeability of sand, plastics, glass beads and walnut shells drops drastically at much lower closure pressures. The other values in Tables IV and V are; Wf is the fracture width in inches and Kh is the fracture flow capacity in millidarcy feet.

In a preferred mode of practicing the present invention a fracturing fluid such as crude oil, kerosene, acid or water, which may or may not contain an agent to prevent fluid loss into the formation is pumped into the well bore under a pressure sufficient to fracture the formation. Thereafter a fluid containing the alumina particles of 30 mesh or larger is placed into the fracture to deposit the alumina particles in a packed multilayer. Finally, the pressure is released and the natural formation fluids initially including the fracturing and propping agent carrying fluids are produced.

It is to be understood that the specific examples of the alumina propping agents given above are illustrative of the type of materials contemplated by the invention and that minor modifications to the compositions may be made without departing from the spirit and scope of the invention. It also should be understood that other propping agents may be combined with the alumina propping agents of this invention so long as the relative insenitivity of the alumina pellets to compaction pressure is not destroyed.

What is claimed is:

1. In a method of improving the permeability to fluids of a sub-surface earth formation penetrated by a well wherein a fluid is pumped into the well to create a fracture therein, the improvement which comprises introducing an alumina propping agent having a size of at least 30 mesh into a fluid; introducing said alumina propping agent containing fluid into a fracture, the compaction pressure of which is at least 8,000 psi, to deposit a packed multilayer distribution of alumina propping agents.

* * * * *